Patented Nov. 19, 1940

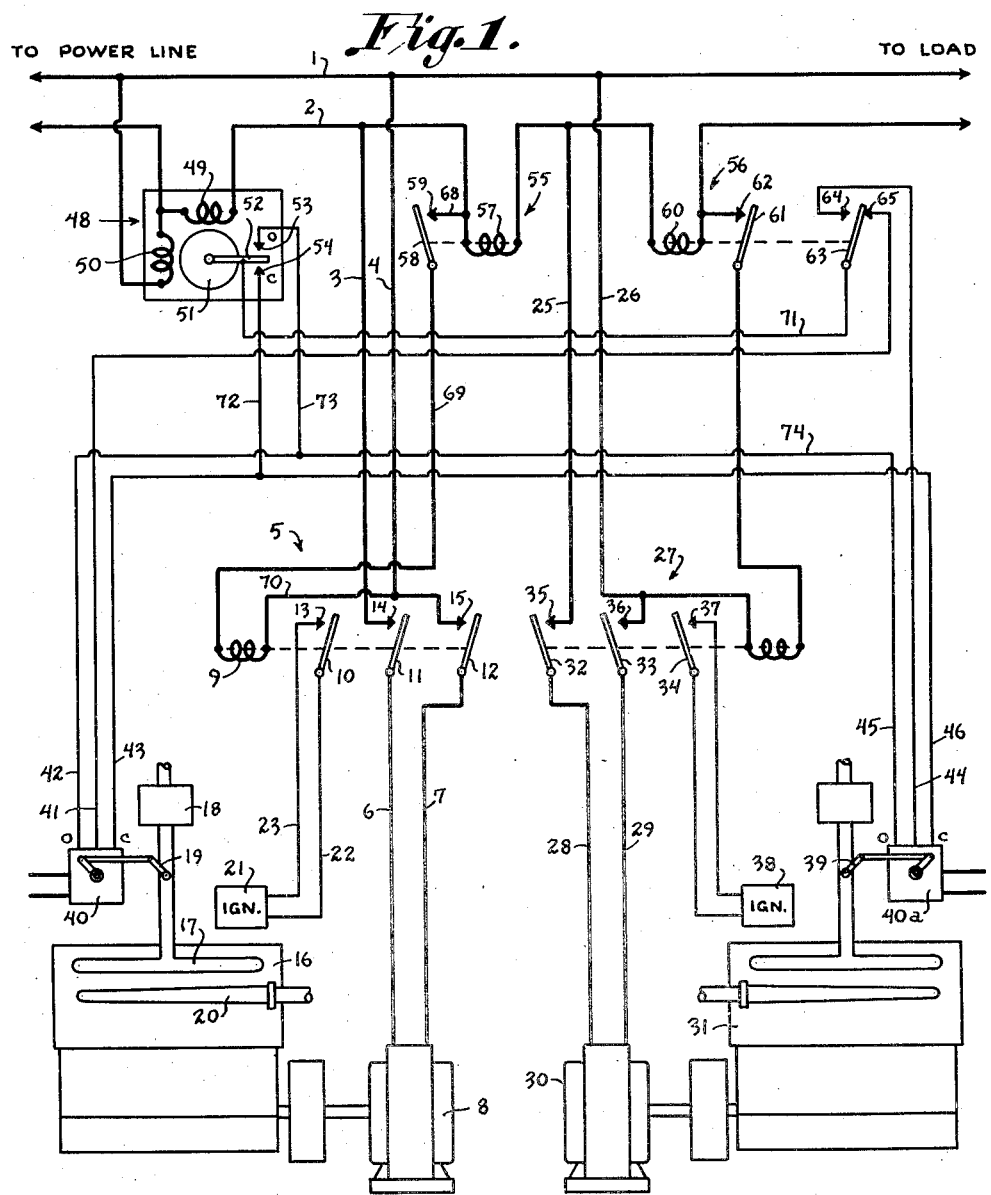

2,222,152

UNITED STATES PATENT OFFICE 2,222,152

POWER SYSTEM

Alwin B. Newton, Minneapolis, Minn., assignor to Minneapolis-Honeywell Regulator Company, Minneapolis, Minn., a corporation of Delaware Application August 2, 1939, Serial No. 287,946

14 Claims. (Cl. 290—30)

This invention relates in general to electric power systems and more particularly to auxiliary power systems for supplying electric power to a building or other premises requiring electric power.

In many buildings or other premises the demand for electric power at certain times is sufficiently high as to render it considerably more economical to utilize individual power plants for generating the power than to purchase the needed power from an electric power company. For this reason, it is not uncommon to provide small internal combustion engine driven generating units for supplying this power. When generating units of this type are utilized, it is desirable to also have provision for receiving power from the utility company in case of breakdown of the generating unit. For installations of this type, the power rate is quite high, due to the fact that the demand for power from the utility is infrequent and is large when it does occur. In fact, it is required in most cases that the customer pay a substantial fixed charge for the power service even though no power is actually taken from the power line. A further disadvantage of systems of this type is that during certain times of the day, the demand for power is quite light, thus causing the generating unit to operate far below capacity which results in inefficient operation which may cause the cost of the power produced to be actually higher than charged by the utility company.

It is an object of this invention to provide an auxiliary power system utilizing a generating unit with an automatic control system which maintains the generating unit out of operation so long as the load on the system is below a predetermined value, the necessary power being supplied by the utility company at such time, but which automatically places the generating unit into operation when the load rises to a value which renders it feasible to operate the generating unit, this unit at such time being controlled to supply substantially all of the power required by the load. This arrangement has the advantage of avoiding inefficient operation of the generating unit and at the same time entitling the user to a lower power rate due to the fact that power from the utility company is frequently utilized.

While the invention is of particular utility in installations as mentioned above, certain features and combinations are of broader application. Other objects and advantages of the invention will become apparent from the following description and the appended claims.

For a full disclosure of this invention, reference is made to the following detailed description and to the accompanying drawing in which Figure 1 indicates diagrammatically a preferred form of the invention, and in which Figure 2 illustrates a modification.

Referring to the drawing, reference characters 1 and 2 indicate line wires which lead from the utility power lines to the load. These line wires are connected by wires 3 and 4 to a relay generally indicated as 5, this relay in turn being connected by wires 6 and 7 to a dynamo 8. The relay 5 may be of usual form consisting of a pull-in coil 9 which actuates through a suitable armature switch arms 10, 11, and 12 which cooperate with contacts 13, 14, and 15, respectively. When coil 9 is energized the switch arms 10, 11, and 12 are brought into engagement with their respective contacts while when the coil 9 is deenergized these switch arms disengage from their contacts by the action of gravity or springs, not shown. When switch arms 11 and 12 engage the contacts 14 and 15, the dynamo 8 is connected to the line wires 1 and 2 while when the switch arms 11 and 12 are disengaged from their contacts, the dynamo 8 is completely disconnected from the line wires.

The dynamo 8 is preferably driven by means of an internal combustion engine 16 which may be of any desired type. For illustrating purposes, this engine is shown as having an intake manifold 17 which is connected to a carburetor 18 and which is controlled by means of a throttle valve operated by a lever 19. This engine also includes the usual exhaust manifold 20 and ignition system 21. This ignition system is connected by wires 22 and 23 to the switch arm 10 and contact 13 of relay 9. Thus when relay 9 is energized, the ignition system 21 for the engine is rendered operative, while when relay 9 is deenergized the ignition system is rendered inoperative for causing the engine to stop.

In some installations it is desirable to provide a plurality of generating units. In such case the line wires 1 and 2 may be also connected through wires 25, 26, relay 27, and wires 28 and 29 to a second dynamo 30 which is driven by a second internal combustion engine 31. The relay 27 may be exactly the same as the relay 5 and includes switch arms 32, 33, and 34 cooperating with contacts 35, 36, and 37. The switch arms 32 and 33 of this relay are connected into the circuit of dynamo 30 while the switch arm 34 controls the ignition circuit 38 of the engine 31.

The throttle valve lever 19 of engine 16 and the throttle valve lever 39 of engine 31 are actuated respectively by means of reversible electric motors 40 and 40a. The motor 40 is provided with a common control wire 41 and opening and closing control wires 42 and 43. When control wires 41 and 42 are connected together the motor 40 operates in a direction for opening the engine throttle valve to increase the output of the engine 16. Conversely, when control wires 41 and 43 are connected together the motor 40 operates in the opposite direction for closing the engine throttle valve. When the control wire 41 is connected to neither wire 42 nor wire 43, the motor 40 and throttle valve remain stationary. The throttle valve motor 41a is exactly the same as the motor 40 and is provided with a common control wire 44, an opening control wire 45 and a closing control wire 46.

The throttle valve motors 40 and 40a are controlled by means of a load responsive device 48. This device may consist of a watt hour meter having a current coil 49 which is connected in series with the line wire 2 and a voltage coil 50 which is connected across line wires 1 and 2. These coils 49 and 50 influence a disc 51 as understood in the art for causing this disc to rotate in one direction or the other upon changes in the flow of power through wires 1 and 2. This disc 51 carries a contact arm 52 which cooperates with opposed contacts 53 and 54, thus forming a reverse current relay. The arm 52 it will be understood, due to its resting upon the disc 51, is caused to rotate through its range of movement with the disc. However, the disc is capable of rotating independently of the arm, due to the frictional engagement between the disc and arm being slight, and thus the watt hour meter also indicates the amount of energy purchased from the utility company. If desired, any other suitable form of reverse current relay may be utilized. The connections of arm 52 and contacts 53 and 54 with the motors 40 and 40a will be traced in the statement of operation which follows.

The relays 5 and 27 are controlled by means of load responsive relays 55 and 56. The relay 55 comprises a coil 57 which is connected in series with the line wire 2 and which operates through a suitable armature, a switch arm 58 which cooperates with a contact 59. This relay is designed and adjusted in a manner to cause the switch arm 58 to remain disengaged from the contact 59 as long as the flow of current through coil 57 is below a predetermined value. However, when the current flow increases above this value, the switch arm 58 is caused to engage contact 59. While for illustrative purposes, a simple current relay has been shown, it will be understood that in cases where the power factor is unfavorable, a power responsive relay having both a current and voltage coil may be utilized. The relay 56 is similar to the relay 55 and includes a coil 60 which is also connected in series with the line wire 2 and which actuates a switch arm 61 cooperating with a contact 62. This relay also includes a second switch arm 63 which cooperates with contacts 64 and 65. Relay 56 is designed and adjusted so that it does not pull in until the flow of current therethrough indicates that the load upon the system is greater than can be handled by a single unit.

*Operation*

As long as the load upon the system is so low that the operation of engine 16 would be inefficient, the load relay 55 will be deenergized which will cause the relay 5 to also be deenergized which disconnects the dynamo 8 from the line wires 1 and 2 and also causes the engine 16 to remain at rest. At this time the relay 56 will also be deenergized which causes deenergization of the relay 27 which in turn prevents engine 31 from operating, and disconnects dynamo 30 from the line wires 1 and 2. At this time the necessary power for the load will be drawn from the utility power lines. Thus as long as the load is so low as to not make it worthwhile to operate engines 16 and 31, these engines will remain at rest and the necessary power is purchased from the utility company.

When the load upon the system increases to a value which makes it desirable to generate the necessary electric power, the load relay 55 will pull in thus causing the switch arm 58 to engage contact 59. This will complete a circuit through the pull in coil 9 of relay 5 as follows: line wire 2, wire 68, switch arm 58, wire 69, pull-in coil 9, wire 70, and wire 4 to line wire 1. This energization of coil 9 will cause switch arms 10, 11, and 12 to engage their respective contacts for connecting the dynamo 8 to the line wires 1 and 2 and also rendering the ignition system 21 of the engine 16 operative. The dynamo 8 will first operate as a motor for causing rotation of the engine 16. The engine will then start and cause the dynamo 8 to operate as a generator for supplying power to the line wires 1 and 2.

At this time the switch arm 63 of relay 56 will engage contact 65 and this will connect the switch arm 52 of the load responsive device 48 to the common wire 41 of throttle valve motor 40. The load responsive device 48 will now control the throttle valve motor 40 in a manner to maintain the flow of power between line wires 1 and 2 and the utility power lines substantially zero. Thus if the engine 16 is operating at a higher output than necessary to carry the existing load, the dynamo 8 will tend to supply power to the utility power lines. This reverse flow of power will cause the switch arm 52 of controller 48 to engage contact 54 which will complete a circuit between common control wire 41 and the closing control wire 43 as follows: wire 41, contact 65, switch arm 63, wire 71, switch arm 52, contact 54, and wire 72 to wire 43. This will cause the motor 40 to close the throttle valve for thus decreasing the output of the engine 16 until it just exactly carries the existing load. At this time the flow of power through controller 48 will be at zero thus causing the switch arm 52 to disengage the contact 54 for causing the throttle valve motor to remain stationary. Conversely, if the output of engine 6 is insufficient to carry the existing load, power will flow from the utility power lines through the controller 58 thus causing the switch arm 52 to engage the contact 53. This will complete a circuit from the common control wire 41 to the opening control wire 42 of motor 40 as follows: wire 41, contact 65, switch arm 63, wire 71, switch arm 52, contact 53, and wire 73 to wire 42. This will cause the throttle valve motor 40 to operate for opening the engine throttle valve thereby increasing the engine output until it carries the existing load. At this time the switch arm 52 will disengage with contact 53 for causing the throttle valve motor 40 to remain at rest.

In the event that the load increases beyond the capacity of engine 16, the load relay 56 will pull in which will energize the relay 27 due to engagement of switch arm 61 with contact 62. Energization of relay 27 will connect the dynamo 30 to the line wires 1 and 2 and also render the ignition system 38 of the engine 31 operative. The dynamo 30 will now operate as a motor for starting engine 31. When this engine starts the dynamo 30 will operate as a generator for supplying power to the line wires 1 and 2. While in Figure 1 the relay 56 has been shown for starting engine 31, this engine if desired may be controlled as shown in Figure 2 by a switch 40a actuated by the throttle valve motor 40, this switch causing starting of engine 31 when engine 16 is operating at a predetermined capacity.

It will be understood that when the relay 56 pulls in, the controller 48 will have caused the throttle valve motor 40 to open the throttle valve of engine 16 wide for causing this engine to operate at maximum capacity. Due to the relay 56 now being energized, the switch arm 63 of this relay will have disengaged contact 65 and engages contact 64. The disengagement of switch arm 63 from the contact 65 breaks the circuit between control wire 41 of motor 40 and the switch arm 52 of controller 48. Consequently, the controller 48 will not affect the throttle valve motor 40 when engine 31 is in operation. Due to the engagement of switch arm 63 with the contact 64, the switch arm 52 of controller 48 is connected to the common control wire 44 of the throttle valve motor 40a. Thus, if additional power is required to carry the load, the switch arm 52 of controller 48 will engage contact 53 which will complete a circuit between control wires 44 and 45 of motor 40a as follows: wire 44, contact 64, switch arm 63, wire 71, switch arm 52, contact 53, wire 73 and wire 74 to wire 45. This will cause the motor 40a to open the throttle valve thus increasing the output of engine 31 until the combined output of engines 16 and 31 just carries the load at which time the switch arm 52 disengages contact 53 for causing the motor 40a to remain stationary. If the load upon the system decreases, the switch arm 52 of controller 48 will engage the contact 54 which completes a circuit between control wires 44 and 46 of motor 40a for causing closing of the throttle valve for decreasing the output of engine 31a. When the combined output of engines 16 and 31 just balances the load the switch arm 52 disengages contact 54 for causing the throttle valve motor to remain at rest.

It will be apparent that when the load upon the system falls to a value which can be carried by the engine 16 the load relay 56 will drop out thus deenergizing the relay 27 for disconnecting dynamo 30 from line wires 1 and 2 and for also stopping the engine 31. At the same time the controller 48 is placed in control of the throttle valve motor 40 for thereby causing the output of engine 16 to be varied for just carrying the existing load. It will also be apparent that when the load decreases to a value which renders operation of engine 16 undesirable, the load relay 55 will drop out thereby deenergizing the relay 5 for disconnecting dynamo 8 from line wires 1 and 2 and for stopping the engine 16. At this time the necessary power will be drawn from the utility power lines.

From the foregoing description it will be apparent that this invention provides an auxiliary power plant which is automatic in operation and which remains out of operation as long as the load is so low as to render operation of the auxiliary power system undesirable. At this time the necessary power for carrying the load is drawn from the utility power lines. However, when the load upon the system increases to a value justifying operation of the auxiliary power system, the system is automatically placed into operation and its output is varied in a manner to carry the existing load.

While a preferred form of the invention has been shown and described, it will be apparent that various modifications may be made without departing from the scope of this invention. I desire therefore to be limited only by the scope of the appended claims.

I claim as my invention:

1. In a system of the class described, in combination, transmission means for conveying energy from a primary source of power to a variable load, an auxiliary source of power for also supplying energy to said load, means responsive to the transmission of energy to said load for rendering said auxiliary source of power operative and inoperative while maintaining said load connected to said primary source of power, and means for varying the output of said auxiliary source of power in accordance with changing load conditions while preventing said auxiliary source of power from supplying energy to said primary source of power.

2. In a system of the class described, in combination, transmission means for conveying energy from a primary source of power to a variable load, an auxiliary source of power for also supplying energy to said load, means responsive to the transmission of energy to said load for rendering said auxiliary source of power operative when the transmission of energy is above a predetermined value and inoperative when the transmission of energy is below a predetermined value while maintaining said load connected to said primary source of power, and means responsive to the transmission of energy for varying the output of said auxiliary source of power in accordance with changing load conditions while preventing said auxiliary source of power from supplying energy to said primary source of power.

3. In a system of the class described, in combination, transmission means for conveying energy from a primary source of power to a load, an auxiliary source of power for also supplying energy to said load, means responsive to the transmission of energy to said load for disconnecting said auxiliary source of power from said load when the transmission of energy is below a predetermined value while connecting said auxiliary source of power to said load when the transmission of energy is above a predetermined value while maintaining said load connected to said primary source of power, and means responsive to the flow of energy between said primary source of power and said load for controlling said auxiliary source of power when connected to said load in a manner tending to avoid such flow of energy.

4. In a system of the class described, in combination, transmission means for conveying energy from a primary source of power to a load, an auxiliary source of power for also supplying energy to said load, and means responsive to the flow of energy between said primary source of power and said load for controlling said auxiliary source of power in a manner tending to avoid such flow of energy.

5. In a system of the class described, in combination, transmission means for conveying energy from a primary source of power to a load, a first auxiliary source of power for supplying energy to said load, a second auxiliary source of power for supplying energy to said load, first means responsive to the flow of energy through said transmission means for controlling said first auxiliary source of power, second means responsive to the transmission of energy to said load for connecting said second auxiliary source of power to said load, and means actuated upon connecting of said second auxiliary source of power to said load for rendering said first responsive means operative to control said second auxiliary source of power.

6. In a system of the class described, in combination, transmission means for conveying energy from a primary source of power to a load, a first auxiliary source of power for supplying energy to said load, a second auxiliary source of power for supplying energy to said load, first means responsive to the flow of energy through said transmission means for controlling said first auxiliary source of power, second means responsive to the transmission of energy to said load for connecting said second auxiliary source of power to said load, and means actuated upon connecting of said second auxiliary source of power to said load for disconnecting said first responsive means from said first auxiliary source of power and for connecting said first responsive means to said second auxiliary source of power.

7. In a system of the class described, in combination, an electrical load, a primary source of electric power, a power line connected between said load and said source of power for transmitting electrical energy from said source of power to said load, an auxiliary generator connected to said power line for also supplying electrical energy to said load, a prime mover for said auxiliary generator, means responsive to the magnitude of said load for disconnecting said generator from said power line when the magnitude of said load is below a predetermined value while connecting said generator to said line when the magnitude of said load is above a predetermined value, and means influenced by the magnitude of the load for controlling said prime mover.

8. In a system of the class described, in combination, an electrical load, a primary source of electric power, a power line connected between said load and said source of power for transmitting electrical energy from said source of power to said load, an auxiliary generator connected to said power line for also supplying electrical energy to said load, a prime mover for said auxiliary generator, means responsive to the magnitude of said load for placing said prime mover out of operation when the magnitude of the load is below a predetermined value while placing said prime mover into operation when the magnitude of the load is above a predetermined value, and means influenced by the magnitude of the load for gradually varying the output of said prime mover when in operation in a manner to supply substantially all of the energy required by said load.

9. In a system of the class described, in combination, an electrical load, a primary source of electric power, a power line connected between said load and said source of power for transmitting electrical energy from said source of power to said load, an auxiliary generator connected to said power line in a manner to communicate with both said primary source of power and said load for also supplying electrical energy to said load, an engine for driving said auxiliary generator, means responsive to the magnitude of said load for disconnecting said generator from said power line and for placing said engine out of operation when the magnitude of said load falls below a predetermined value while connecting said generator to said power line and placing said engine into operation when the magnitude of the load rises above a predetermined value, an output controller for said engine, and means responsive to flow of energy between said primary source of power and said load for actuating said output controller in a manner to avoid flow of energy between said primary source of power and said load.

10. In a system of the class described, in combination, an electrical load, a primary source of electric power, a power line connected between said load and said primary source of power for transmitting electrical energy from said primary source of power to said load, a first auxiliary generator, a first internal combustion engine for driving said first auxiliary generator, a second auxiliary generator, a second internal combustion engine for driving said second auxiliary generator, means responsive to the magnitude of said load for connecting said first auxiliary generator to said power line and for starting said first engine when the magnitude of the load rises to a predetermined value, means for connecting said second auxiliary generator to said power line and for starting said second engine when the magnitude of said load rises to a higher value, a first controller for varying the output of said first engine, a second controller for varying the output of said second engine, a load influenced device, and means for placing said device in control of said first controller when said second engine is out of operation while placing said device in control of said second controller when the second engine is in operation.

11. In a system of the class described, in combination, an electrical load, a first generator for supplying electric power to said load, a first prime mover for driving said first generator, a second generator for supplying electric power to said load, a second prime mover for driving said second generator, means for sequentially placing said prime movers into operation, a first controller for varying the output of said first prime mover, a second controller for varying the output of said second prime mover, a load responsive device, and selective means for placing said device in control of said first controller when the second prime mover is out of operation while placing said device in control of said second controller when the second prime mover is in operation.

12. In a system of the class described, in combination, an electrical load, a primary source of electric power, a power line connected between said load and said source of power for transmitting electrical energy from said source of power to said load, an auxiliary generator connected to said power line in a manner to communicate with both said primary source of power and said load for also supplying electrical energy to said load, an engine for driving said auxiliary generator, means responsive to the magnitude of said load for disconnecting said generator from said power line when the magnitude of said load falls below a predetermined value while connecting said generator to said power line when the magnitude of the load rises above a predetermined value, an output controller for said engine, and means responsive to flow of energy between said primary source of power and said load for actuating said output controller in a manner to avoid flow of energy between said primary source of power and said load.

13. In a system of the class described, in combination, an electrical load, a primary source of electric power, a power line connected between said load and said source of power for transmitting electrical energy from said source of power to said load, an auxiliary generator connected to said power line in a manner to communicate with both said primary source of power and said load for also supplying electrical energy to said load, an engine for driving said auxiliary generator, means responsive to the magnitude of said load for placing said engine out of operation when the magnitude of said load falls below a predetermined value while placing said engine into operation when the magnitude of the load rises above a predetermined value, an output controller for said engine, and means responsive to flow of energy between said primary source of power and said load for actuating said output controller in a manner to avoid flow of energy between said primary source of power and said load.

14. In a system of the class described, in combination, transmission means for conveying energy from a primary source of power to a variable load, a first auxiliary source of power for supplying energy to said load, a second auxiliary source of power for supplying energy to said load, first means responsive to the transmission of energy to said load for rendering said first auxiliary source of power operative and inoperative, second means responsive to the transmission of energy to said load for rendering said second auxiliary source of power operative and inoperative, and control means responsive to the transmission of energy for varying the output of both of said auxiliary sources of power in accordance with changing load conditions while preventing said auxiliary sources of power from supplying energy to said primary source of power.

ALWIN B. NEWTON.